United States Patent
Cheng et al.

(10) Patent No.: US 11,151,010 B2
(45) Date of Patent: Oct. 19, 2021

(54) RESOURCE CONFIGURATION METHOD, MOBILE TERMINAL AND STORAGE MEDIUM

(71) Applicant: GUANGDONG OPPO MOBILE TELECOMMUNICATIONS CORP., LTD., Guangdong (CN)

(72) Inventors: Jie Cheng, Dongguan (CN); Yan Chen, Dongguan (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 213 days.

(21) Appl. No.: 16/045,502

(22) Filed: Jul. 25, 2018

(65) Prior Publication Data

US 2019/0034311 A1 Jan. 31, 2019

(30) Foreign Application Priority Data

Jul. 31, 2017 (CN) .......................... 201710639832.1

(51) Int. Cl.
*G06F 11/34* (2006.01)
*G06F 9/50* (2006.01)
(Continued)

(52) U.S. Cl.
CPC ...... *G06F 11/3409* (2013.01); *G06F 9/44505* (2013.01); *G06F 9/5011* (2013.01); *G06F 11/3024* (2013.01); *G06F 2209/501* (2013.01)

(58) Field of Classification Search
None
See application file for complete search history.

(56) References Cited

U.S. PATENT DOCUMENTS 7,496,903 B2 2/2009 Rees
2012/0079497 A1* 3/2012 Gangemi .............. G06F 9/5011
718/104
(Continued)

FOREIGN PATENT DOCUMENTS

CN 10340151 A 12/2013
CN 104732285 A 6/2015
(Continued)

OTHER PUBLICATIONS

International Search Report in international application No. PCT/CN2018/097644, dated Oct. 18, 2018.
(Continued)

*Primary Examiner* — Lewis A Bullock, Jr.
*Assistant Examiner* — Melissa A Headly
(74) *Attorney, Agent, or Firm* — Ladas & Parry, LLP

(57) ABSTRACT

Embodiments of the application provide a resource configuration method, a mobile terminal and a storage medium. An operating system in an operating system space of a mobile terminal firstly receives a scenario data packet sent by a running target application program, the scenario data packet comprising an application type identifier and a scenario identifier of the target application program, then determines a performance improvement strategy according to the application type identifier and the scenario identifier, and adjusts allocation of a system resource for the target application program according to the performance improvement strategy.

14 Claims, 7 Drawing Sheets

(51) Int. Cl.
*G06F 9/445* (2018.01)
*G06F 11/30* (2006.01)

(56) References Cited

U.S. PATENT DOCUMENTS

| | | | |
|---|---|---|---|
| 2013/0080142 A1 | 3/2013 | Gangemi et al. | |
| 2013/0080641 A1* | 3/2013 | Lui | H04L 43/045 709/226 |
| 2017/0192819 A1 | 7/2017 | Xie | |

FOREIGN PATENT DOCUMENTS

| | | |
|---|---|---|
| CN | 105159781 A | 12/2015 |
| CN | 105893142 A | 8/2016 |
| CN | 106020987 A | 10/2016 |
| CN | 106095592 A | 11/2016 |
| CN | 106549880 A | 3/2017 |
| CN | 107483725 A | 12/2017 |
| KR | 100838526 B1 | 6/2008 |
| WO | 2009057915 A2 | 5/2009 |

OTHER PUBLICATIONS

Written Opinion of the International Search Authority in international application No. PCT/CN2018/097644, dated Oct. 18, 2018.
Supplementary European Search Report in European application No. 18186480.2 dated Jan. 7, 2019.
First Office Action of the Chinese application No. 201710639832.1, dated Apr. 16, 2019.
Notice of Rejection of the Chinese application No. 201710639832.1, dated Jul. 29, 2019.
Office Action of the Indian application No. 201814028602, dated Jan. 14, 2021.
Oral Office Action of the European application No. 18186480.2, dated Apr. 26, 2021.

* cited by examiner

Android system

RESOURCE CONFIGURATION METHOD, MOBILE TERMINAL AND STORAGE MEDIUM

CROSS-REFERENCE TO RELATED APPLICATION

This application claims priority to Chinese Patent Application No. 201710639832.1 filed on Jul. 31, 2017, the disclosure of which is incorporated by reference herein in its entirety.

TECHNICAL FIELD

The application relates to the technical field of mobile terminals, and particularly to a resource configuration method, a mobile terminal and a storage medium.

BACKGROUND

With rapid development of related technologies of smart phones, more and more applications are installed in mobile phones of users, for example, reading applications, payment applications, game applications and music applications, and mobile phones have become indispensable for basic necessities of people's lives.

SUMMARY

At a first aspect, the embodiments of the application provide a resource configuration method, which may be applied to a mobile terminal, in which an operating system and one or more application programs are running, the method including that: the operating system receives a scenario data packet sent by the running target application program, the scenario data packet including an application type identifier and a scenario identifier of the target application program; the operating system determines a performance improvement strategy for the target application program according to the application type identifier and the scenario identifier; and the operating system adjusts allocation of a system resource for the target application program according to the performance improvement strategy.

At a second aspect, the embodiments of the application provide a mobile terminal, which may include a processor, a memory storing a computer program, wherein the computer program, when running in the processor, implements a resource configuration method. The method includes the following operations: receiving a scenario data packet sent by a running target application program, the scenario data packet comprising an application type identifier and a scenario identifier of the target application program; determining a performance improvement strategy for the target application program according to the application type identifier and the scenario identifier; and adjusting allocation of a system resource for the target application program according to the performance improvement strategy.

At a third aspect, the embodiments of the application provide a non-transitory computer-readable storage medium storing a computer program, the computer program, when running in a processor, implements a resource allocation method. The method includes the following operations: receiving a scenario data packet sent by a running target application, the scenario data packet comprising an application type identifier and a scenario identifier of the target application program; determining a performance improvement strategy for the target application program according to the application type identifier and the scenario identifier; and adjusting allocation of a system resource for the target application program according to the performance improvement strategy.

BRIEF DESCRIPTION OF DRAWINGS

The drawings involved in the embodiments of the application will be simply introduced below.

DETAILED DESCRIPTION

In order to make the solutions of the application better understood by those skilled in the art, the technical solutions in the embodiments of the application will be clearly and completely described below in combination with the drawings in the embodiments of the application. Obviously, the described embodiments are not all embodiments but only part of embodiments of the application. All other embodiments obtained by those of ordinary skilled in the art on the basis of the embodiments in the application without creative work shall fall within the scope of protection of the application.

Terms "first", "second" and the like in the specification, claims and drawings of the application are adopted not to describe a specific sequence but to distinguish different objects. In addition, terms "include" and "have" and any transformation thereof are intended to cover nonexclusive inclusions. For example, a process, method, system, product or devices including a series of operations or units is not limited to the operations or units which are clearly listed, but may further include other operations or units which are not listed or further include other operations or units intrinsic to the process, the method, the product or the devices.

"Embodiment" mentioned in the disclosure means that a specific characteristic, structure or property described in combination with the embodiment may be included in at least one embodiment of the application. Appearance of this phrase at each position in the specification does not always designate the same embodiment as well as an independent or alternate embodiment exclusive from the other embodiments. It is explicitly and implicitly understood by those skilled in the art that the embodiments described in the disclosure may be combined with the other embodiments.

The mobile terminal involved in the embodiments of the application may include various kinds of handheld devices, wearable devices, computing devices or other processing devices, connected to a wireless modem, with a wireless communication function and various forms of User Equipments (UEs), Mobile Stations (MSs), terminal devices and the like. For convenience of description, the devices mentioned above are collectively referred to as mobile terminals. An operating system involved in the embodiments of the disclosure is a software system which performs unified management on hardware resources and provides a service interface for a user.

Embodiments of the application provide a resource configuration method, a mobile terminal and a storage medium, which may improve performance and stability of a running target application program of a mobile terminal.

Figure 1A:
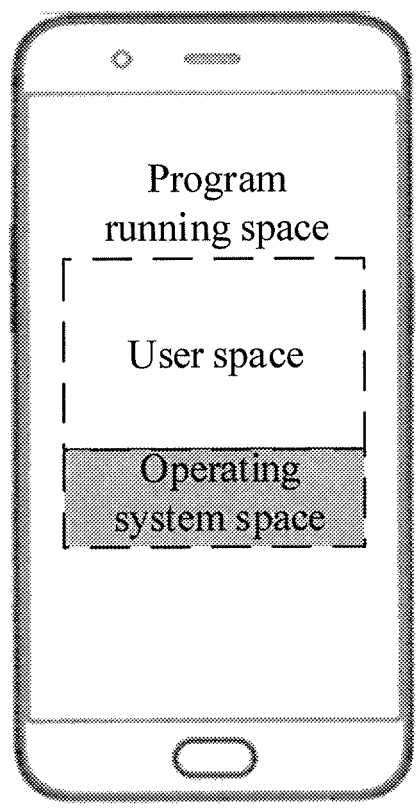
FIG. 1A illustrates a structure diagram of a smart phone.
Figure 1B:
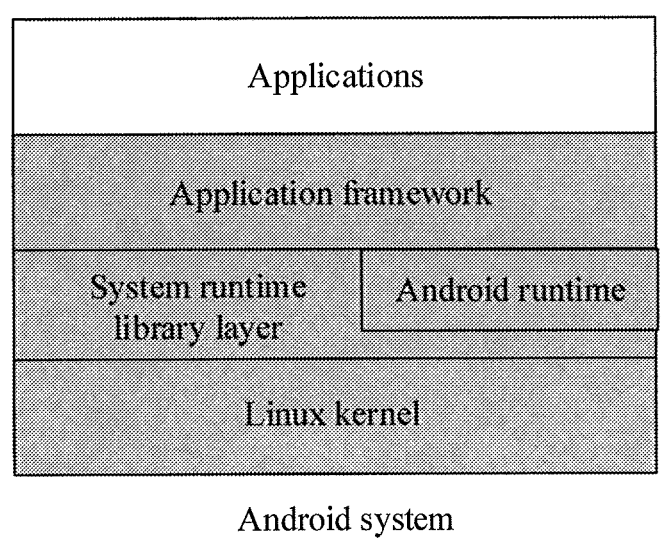
FIG. 1B illustrates a system architecture diagram of an Android system.

As illustrated in FIG. 1A, at present, a mobile terminal such as a smart phone is usually provided with a program running space. The program running space includes a user space and an operating system space. One or more application programs, which are third-party application programs installed in the mobile terminal, run in the user space, while an operating system of the mobile terminal runs in the operating system space. The mobile terminal may specifically run an Android system, an iOS developed by the Apple Inc. and the like, and there are no uniqueness limits made herein. As illustrated in FIG. 1B, for example, the mobile terminal runs the Android system, the corresponding user space includes applications in the Android system, and the operating system space may include an application framework, a system runtime library layer (including Libraries and Android Runtime) and a Linux kernel. The applications include various application programs directly interacting with a user or service programs written with a Java language and running in the background. For example, programs realizing common basic functions on the smart phone include programs such as a Short Messaging Service (SMS), telephone dialing, a picture viewer, a calendar, a game, a map and a World Wide Web (Web) browser and other application programs developed by developers. The application framework provides a series of class libraries which are required by development of the Android application programs, may be configured for reusable components and may also implement personalized extension by inheritance. The system runtime library layer is a support of the application framework, and provides service for each component in the Android system. The system runtime library layer consists of the system class libraries and the Android Runtime. The Android Runtime includes two parts, i.e., core libraries and Dalvik virtual machines. The Linux kernel is configured to realize core functions such as hardware devices driving, process and memory management, a network protocol stack, power management and wireless communication.

A process created by a third-party application program runs in the user space at the beginning, and when operations of sending data through a network, reading a disk resource and the like are to be executed, it is necessary to call a standard interface function of write, send and the like provided by the operating system, that is, a Central Processing Unit (CPU) calls codes in the operating system space to respond to a request operation of a user. Thus, it can be seen that in order to call a function provided by the operating system, the third-party application program has to call the standard interface function provided by the operating system. In addition, the operating system does not know about the specific function being executed by the third-party application program, and the target application program cannot command the operating system to execute a special operation, as the two are mutually independent of each other. Therefore, the operating system cannot distinguish internal running scenarios of the target application program, but has to use a set of standard parameters for adaptation. Therefore, pertinent performance optimization for the internal running scenario of the target application program may not be implemented.

To solve the above problems, the embodiments of the application disclose a resource configuration method for a target application program of a mobile terminal. In the method, an operating system receives a scenario data packet sent by the running target application program, the scenario data packet including an application type identifier and a scenario identifier of the target application program; the operating system determines a performance improvement strategy for the target application program according to the application type identifier and the scenario identifier; and the operating system adjusts allocation of a system resource for the target application program according to the performance improvement strategy. According to the embodiments, the operating system may optimize performance of the running target application program in an internal running scenario, thus facilitating increasing the real-time capability and accuracy of controlling performance optimization of the target application program by the mobile terminal.

The embodiments of the application will be introduced below in combination with the drawings.

Figure 2:
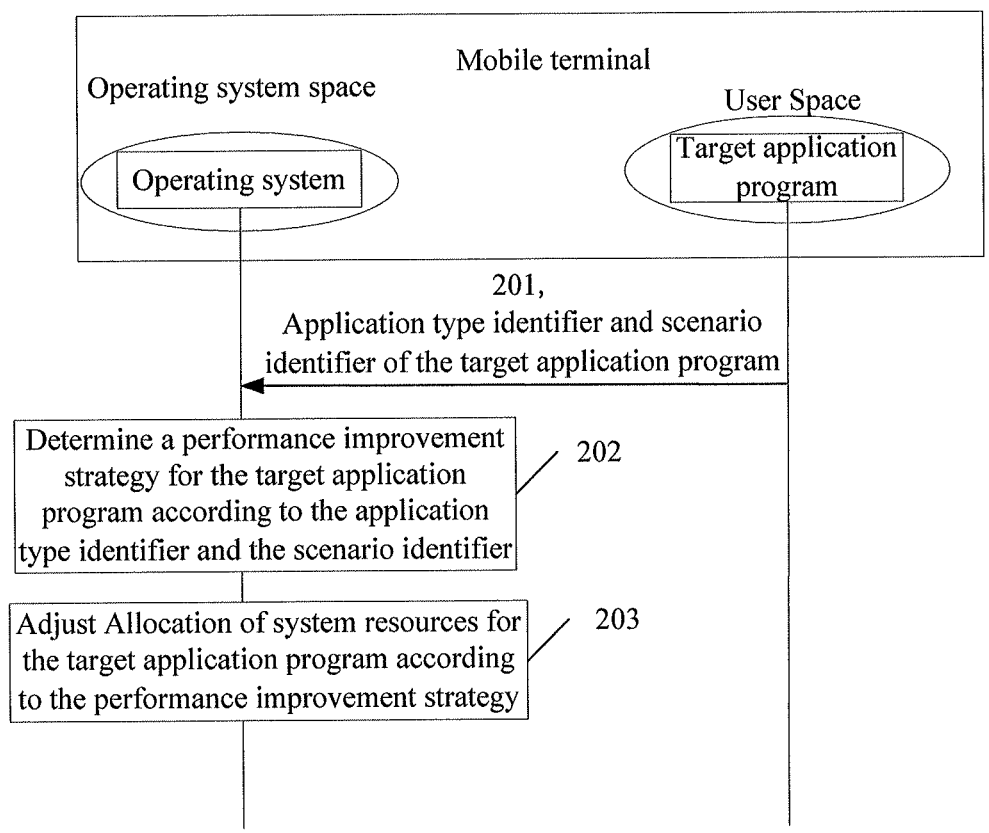
FIG. 2 illustrates a flowchart of a resource configuration method according to an embodiment of the application.

FIG. 2 illustrates a flowchart of a resource configuration method according to an embodiment of the application. The method is applied to a mobile terminal, in which an operating system and one or more application programs (including a target application program) are running. As illustrated in the figure, the resource configuration method includes the following operations illustrated in blocks. The method may begin from block S201.

At block S201, the operating system receives a scenario data packet sent by a running target application program. The scenario data packet includes an application type identifier and a scenario identifier of the target application program.

The target application program is a third-party application program installed in a user space of the mobile terminal, the third-party application program may be, for example, an instant messaging application and a game application, and the third-party application program may be installed by a user or may be pre-installed by a developer before shipment of the mobile terminal. There are no uniqueness limits made herein.

The scenario data packet may include the application type identifier and the scenario identifier of the running target application program, and may further include at least one of information of a performance parameter (e.g., key performance parameter), a data format identifier, launching information, resource updating information, account login information, interface type information, behavior information (for example, data sending behavior information and data receiving behavior information) of the target application program and the like, and there are no uniqueness limits made herein. In addition, a format of the scenario data packet may be a data transmission format such as a JavaScript Object Notation (JSON), a Protocol Buffer (Protobuf) and a custom format, and there are no uniqueness limits made herein.

In a possible example, a preset data channel is provided between the target application program and the operating system; and the operation of the operating system's receiving the scenario data packet sent by the running target application program includes that: the operating system receives the scenario data packet sent by the running target application program through the preset data channel.

The preset data channel is an effective data transmission link established between the target application program and the operating system during running of the target application program, and the data transmission link may be cleared after the target application program stops running.

In the possible example, the target application program includes a data connection module, and the operating system includes a data connection management module; and the method further includes that the data connection management module establishes the preset data channel with the data connection module.

In the possible example, the target application program may further include a data collection module, a data arrangement module, a priority management module and a data receiving module. The data collection module is configured to collect key information of the running target application program. The data management module is configured to arrange the collected key information, for example, combining repeated information and deleting redundant information. The priority management module is configured to classify the collected key information according to importance degrees of the key information, preferentially process the key information with a higher priority, filter out the key information with a lower priority or reduce use of the key information with the lower priority in a data packet generation process. The data receiving module is configured to receive and parse data sent by the operating system and transmit the data into the target application program.

At block S202, the operating system determines a performance improvement strategy for the target application program according to the application type identifier and the scenario identifier.

The performance improvement strategy is a resource configuration strategy for improving running performance of the running target application program, for example, a CPU resource adjustment strategy, a Graphic Processing Unit (GPU) resource adjustment strategy, a memory bandwidth resource adjustment strategy, a disk resource adjustment strategy and a network resource adjustment strategy, and there are no uniqueness limits made herein.

At block S203, the operating system adjusts allocation of a system resource for the target application program according to the performance improvement strategy.

In a possible example, a resource includes at least one of the following resources of the mobile terminal: a CPU resource, a GPU resource, a memory bandwidth resource, a disk resource and a network resource. The network resource includes a network resource of a data network of the mobile terminal, a network resource of a Wireless Fidelity (Wi-Fi) network, a control parameter resource of a Bluetooth module and the like.

When the system resource is at least one of the CPU resource, the GPU resource, the memory bandwidth resource or the disk resource, the operating system may communicate with a kernel layer of an operating system space in a direct-connection communication manner, to adjust configuration of the system resource. The direction-connection communication manner is direct communication implemented through an abstract Application Programming Interface (API).

When the system resource is the network resource, the operating system may communicate with the kernel layer of the operating system space in an indirect communication manner, to adjust the configuration of the system resource. The indirect communication manner is indirect communication implemented by calling a proxy service. For example, among the network resources, a Wi-Fi subsystem or a data network subsystem runs in a different system from the operating system, and thus these system resources may be indirectly accessed by means of some proxies. A Wi-Fi proxy service is provided in the operating system, and an interface of the proxy service may be called for indirect communication with the Wi-Fi subsystem.

It can be seen that, in the embodiments of the application, the operating system in the operating system space of the mobile terminal firstly receives the scenario data packet sent by the running target application program, the scenario data packet including the application type identifier and the scenario identifier of the running target application program, then the operating system determines the performance improvement strategy for the running target application program according to the application type identifier and the scenario identifier, and finally, the operating system adjusts allocation of a system resource for the running target application program according to the performance improvement strategy. Since the scenario data packet includes the application type identifier and the scenario identifier of the target application program and the scenario data packet is sent by the running target application program, the operating system may accurately determine a practical strategy module according to the application type identifier and further call the strategy module to elaborately determine the performance improvement strategy for a present internal running scenario of the target application program according to the scenario identifier, and the operating system adjusts configuration of a system resource for the target application program in real time according to the performance improvement strategy. Therefore, the operating system may implement performance optimization of the running target application program in real time, thus facilitating increasing real-time capability and accuracy of controlling performance optimization of the target application program by the mobile terminal.

In a possible example, the operating system includes a management module and multiple strategy modules, and each strategy module is configured to determine a performance improvement strategy for an application program in at least one application program of the same application type; the operation of the operating system's determining the performance improvement strategy for the target application program according to the application type identifier and the scenario identifier includes that: the management module determines the application type identifier and scenario identifier in the scenario data packet; the management module determines the strategy module corresponding to the application type identifier from the multiple strategy modules; and the strategy module determines a performance improvement strategy corresponding to the scenario identifier to be the performance improvement strategy for the target application program.

Each of the multiple strategy modules is applicable to applications of a respective type. For example, a first strategy module is applicable to game applications, and a second strategy module is applicable to instant messaging applications.

The operation of the management module's determining the strategy module corresponding to the application type identifier from the multiple strategy modules includes that: the management module queries a preset mapping relationship between strategy modules and application type identifiers by taking the application type identifier as a query identifier, to determine the strategy module corresponding to the application type identifier in the scenario data packet.

It can be seen that, in the example, the multiple strategy modules may be classified to implement elaborate control over different types of applications, and the mobile terminal is not required to load all of the strategy modules at the same time and is merely required to load the strategy module corresponding to the target application program, running in the foreground, of the mobile terminal, thus facilitating reduction of resource occupation and improvement of the resource utilization rate and control efficiency.

In a possible example, the scenario data packet includes a data format identifier; and the operation of the management module's determining the application type identifier and scenario identifier in the scenario data packet includes that: the management module parses the scenario data packet in a data format indicated by the data format identifier to determine the application type identifier and the scenario identifier.

The data format identifier may be, for example, the JSON and the Protobuf, which is not limited here.

It can be seen that, in the example, since the data format identifier may enable the operating system to rapidly identify a data transmission format used for the scenario data packet after receiving the scenario data packet, the application type identifier and scenario identifier in the scenario data packet can be parsed out in real time, thus reducing a processing delay and facilitating improvement of data processing efficiency and improvement of real-time capability of resource adjustment for the running target application program.

In a possible example, the operating system includes a management module and a strategy module, and the operation of the operating system's determining the performance improvement strategy for the target application program according to the application type identifier and the scenario identifier includes that: the strategy module acquires the application type identifier and scenario identifier in the scenario data packet; the strategy module determines a performance improvement strategy package corresponding to the application type identifier; and the strategy module determines the performance improvement strategy corresponding to the scenario identifier from the performance improvement strategy package to be the performance improvement strategy for the target application program.

It can be seen that, in the example, the operating system includes the management module and the strategy module, and the management module and the strategy module may cooperate to confirm the performance improvement strategy for the target application program, that is, the process for determining the performance improvement strategy is implemented in a modularization manner, each module executes a corresponding specified function, and failure of a single module would not influence a status of another module, thus facilitating increasing stability of controlling running optimization of the target application program by the mobile terminal.

In a possible example, the scenario data packet includes a data format identifier, and the operation of the strategy module's acquiring the application type identifier and scenario identifier from the scenario data packet includes that: the management module parses the scenario data packet in the data format indicated by the data format identifier, to determine the application type identifier and the scenario identifier of the target application program, and sends the application type identifier and the scenario identifier to the strategy module. It can be seen that the management module performs unified processing on the scenario data packet, and the strategy module can directly receive a processing result of the management module. Such a setting is favorable for weight reduction and elaboration of a function of the strategy module, brings convenience to operations such as maintenance, addition and the like over the strategy module and improves system stability.

Alternatively, in a possible example, the scenario data packet includes a data format identifier, and the operation of the strategy module's acquiring the application type identifier and scenario identifier from the scenario data packet includes that: the management module sends the scenario data packet to the strategy module; and the strategy module parses the scenario data packet in the data format indicated by the data format identifier, to determine the application type identifier and the scenario identifier of the target application program. It can be seen that the management module merely transmits the scenario data packet to the strategy module for processing, so that the strategy module is not required to be continuously enabled after transmitting the scenario data packet and may rapidly enter the sleep mode, which is favorable for reduction of overall power consumption of the operating system and improvement of the efficiency.

Alternatively, in a possible example, the scenario data packet includes a data format identifier, and the operation of the strategy module's acquiring the application type identifier and scenario identifier from the scenario data packet includes that: the management module determines a first data format associated with the strategy module, converts a second data packet of the scenario data packet into the first data packet upon detection of the first data format being inconsistent with the second data packet of the scenario data packet, and sends the converted scenario data packet to the strategy module; and the strategy module parses the converted scenario data packet in the first data format, to determine the application type identifier and the scenario identifier of the target application program. It can be seen that the management module may convert the scenario data packet which cannot be identified by the strategy module into a scenario data packet which can be identified for the strategy module and transmit scenario data packet to the strategy module for processing, thus avoiding the phenomenon that the application type identifier and the scenario identifier cannot be accurately determined due to a format difference, and facilitating increasing a success rate of performing accurate resource configuration by the mobile terminal for the running target application program.

In a possible example, the operation of the strategy module's determining the performance improvement strategy package corresponding to the application type identifier includes that: the strategy module queries a preset mapping relationship between performance improvement strategy packages and application type identifiers by taking the application type identifier as a query identifier, to determine the performance improvement strategy package corresponding to the application type identifier.

The operation of the strategy module's determining the performance improvement strategy corresponding to the scenario identifier from the performance improvement strategy package to be the performance improvement strategy for the target application program includes that: the strategy module queries a preset mapping relationship between performance improvement strategies in the performance improvement strategy package and scenario identifiers by taking the scenario identifier as a query identifier, to determine the performance improvement strategy corresponding to the scenario identifier to be the performance improvement strategy for the target application program.

A performance improvement strategy package may include different performance improvement strategies corresponding to different scenario identifiers. For example, for a game application, a performance improvement strategy package corresponding to an application type identifier may include a performance improvement strategy corresponding to a login process scenario in the running process of the game application, a performance improvement strategy corresponding to a main interface scenario in the running process of the game application or the like. There are no uniqueness limits made herein.

It can be seen that, in the example, the application type identifier is used to determine the corresponding performance improvement strategy package, the scenario identifier is used to further elaborately find the specific performance improvement strategy adapted to the scenario, and the specific performance improvement strategy may be rapidly found by a simple lookup algorithm according to the application type identifier and the scenario identifier. Therefore, the method has a low delay and a high accuracy, and improvement of the real-time capability and accuracy of controlling running optimization of the target application program by the mobile terminal is facilitated.

Figure 3:
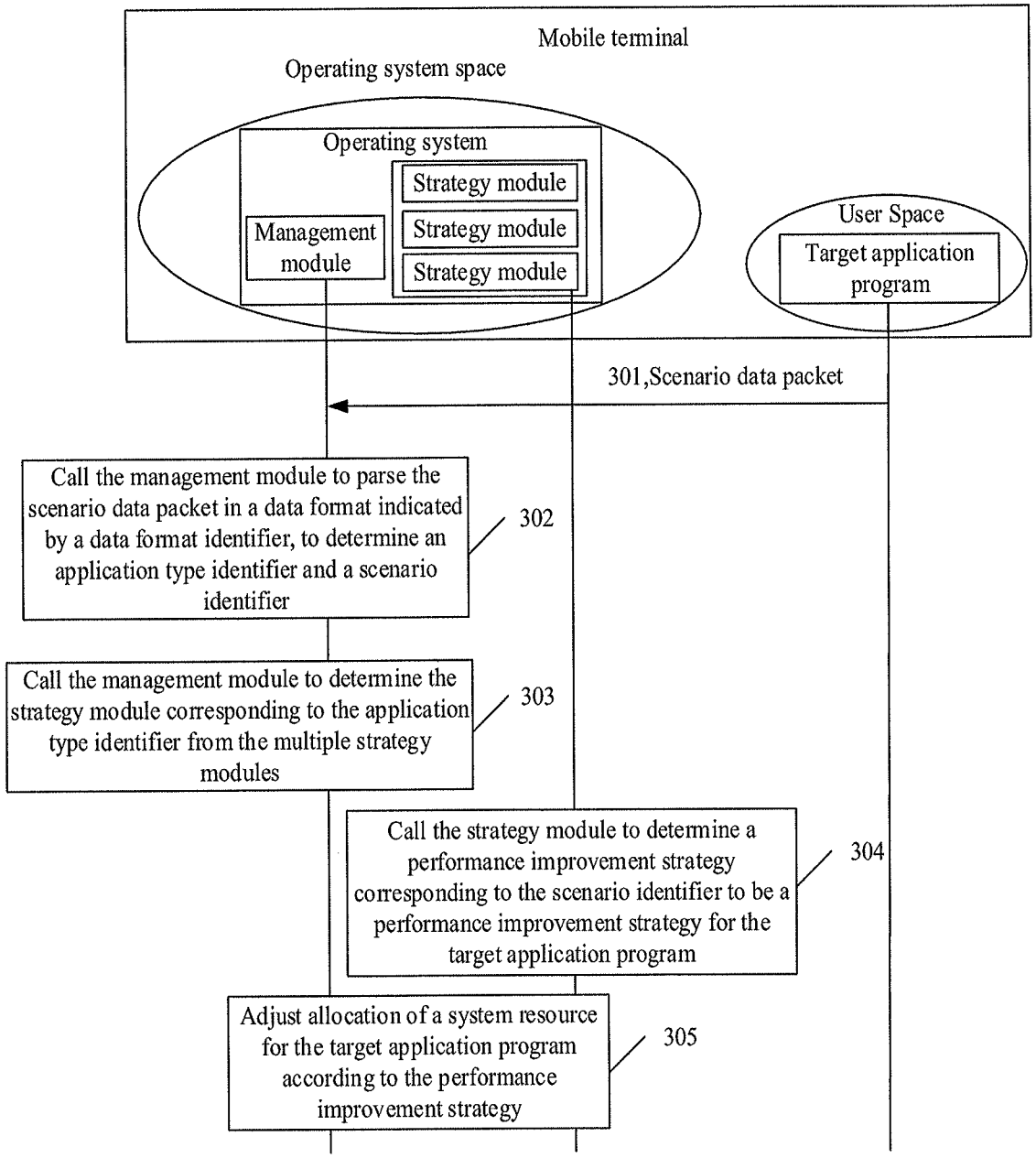
FIG. 3 illustrates a flowchart of an application optimization method according to an embodiment of the application.

Consistent with the embodiment illustrated in FIG. 2, FIG. 3 illustrates a flowchart of a resource configuration method according to an embodiment of the application. The method is applied to a mobile terminal, in which an operating system and one or more application programs are running. The operating system includes a management module and multiple strategy modules, and each strategy module is configured to determine a performance improvement strategy for an application program in at least one application program of the same application type. As illustrated in the figure, the resource configuration method includes the following operations illustrated in blocks. The method may begin from block S301.

At block S301, the operating system receives a scenario data packet sent by a running target application program. The scenario data packet includes an application type identifier and a scenario identifier of the target application program.

The operating system includes the management module and the multiple strategy modules, and each strategy module is configured to determine the performance improvement strategy of the application program in the at least one application program of the same application type.

At block S302, the management module parses the scenario data packet in a data format indicated by a data format identifier, to determine the application type identifier and the scenario identifier.

At block S303, the management module determines the strategy module corresponding to the application type identifier from the multiple strategy modules.

At block S304, the strategy module determines a performance improvement strategy corresponding to the scenario identifier to be the performance improvement strategy for the target application program.

At block S305, the operating system adjusts allocation of a system resource for the target application program according to the performance improvement strategy.

It can be seen that, in the embodiment of the application, the operating system in an operating system space of the mobile terminal firstly receives the scenario data packet sent by the running target application program, the scenario data packet including the application type identifier and the scenario identifier of the running target application program, then the operating system determines the performance improvement strategy for the running target application program according to the application type identifier and the scenario identifier, and finally, the operating system adjusts allocation of a system resource for the running target application program according to the performance improvement strategy. Since the scenario data packet includes the application type identifier and the scenario identifier of the target application program, and the scenario data packet is sent by the running target application program, the operating system may accurately determine a practical strategy module according to the application type identifier and further call the strategy module to elaborately determine the performance improvement strategy for a present internal running scenario of the target application program according to the scenario identifier, and the operating system adjusts configuration of a system resource for the target application program in real time according to the performance improvement strategy. Therefore, the operating system may implement performance optimization of the running target application program in real time, thus facilitating increasing real-time capability and accuracy of controlling performance optimization of the target application program by the mobile terminal.

In addition, the multiple strategy modules may be classified to implement elaborate control over different types of applications, and the mobile terminal is not required to load all of the strategy modules at the same time and is only required to load the strategy module corresponding to the target application program, running in the foreground, of the mobile terminal, thus facilitating reduction of resource occupation and improvement of a resource utilization rate and control efficiency.

Moreover, since the data format identifier may enable the operating system to rapidly identify a data transmission format used for the scenario data packet after receiving the scenario data packet, the application type identifier and scenario identifier in the scenario data packet can be parsed out in real time, thus reducing a processing delay and facilitating improvement of data processing efficiency and improvement of real-time capability of resource adjustment for the running target application program.

Figure 4A:
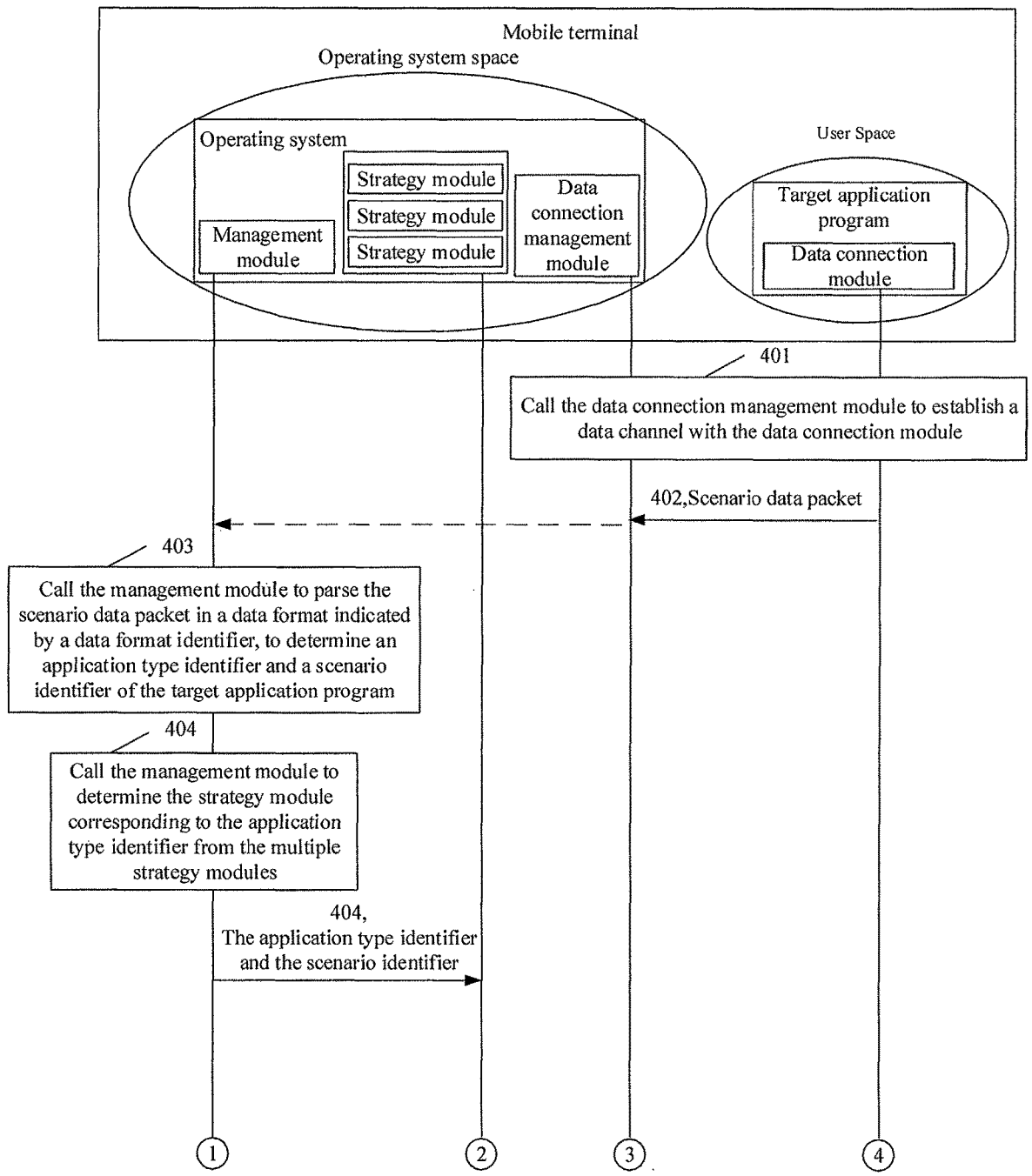
FIGS. 4A and 4B illustrate a flowchart of an application optimization method according to an embodiment of the application.
Figure 4B:
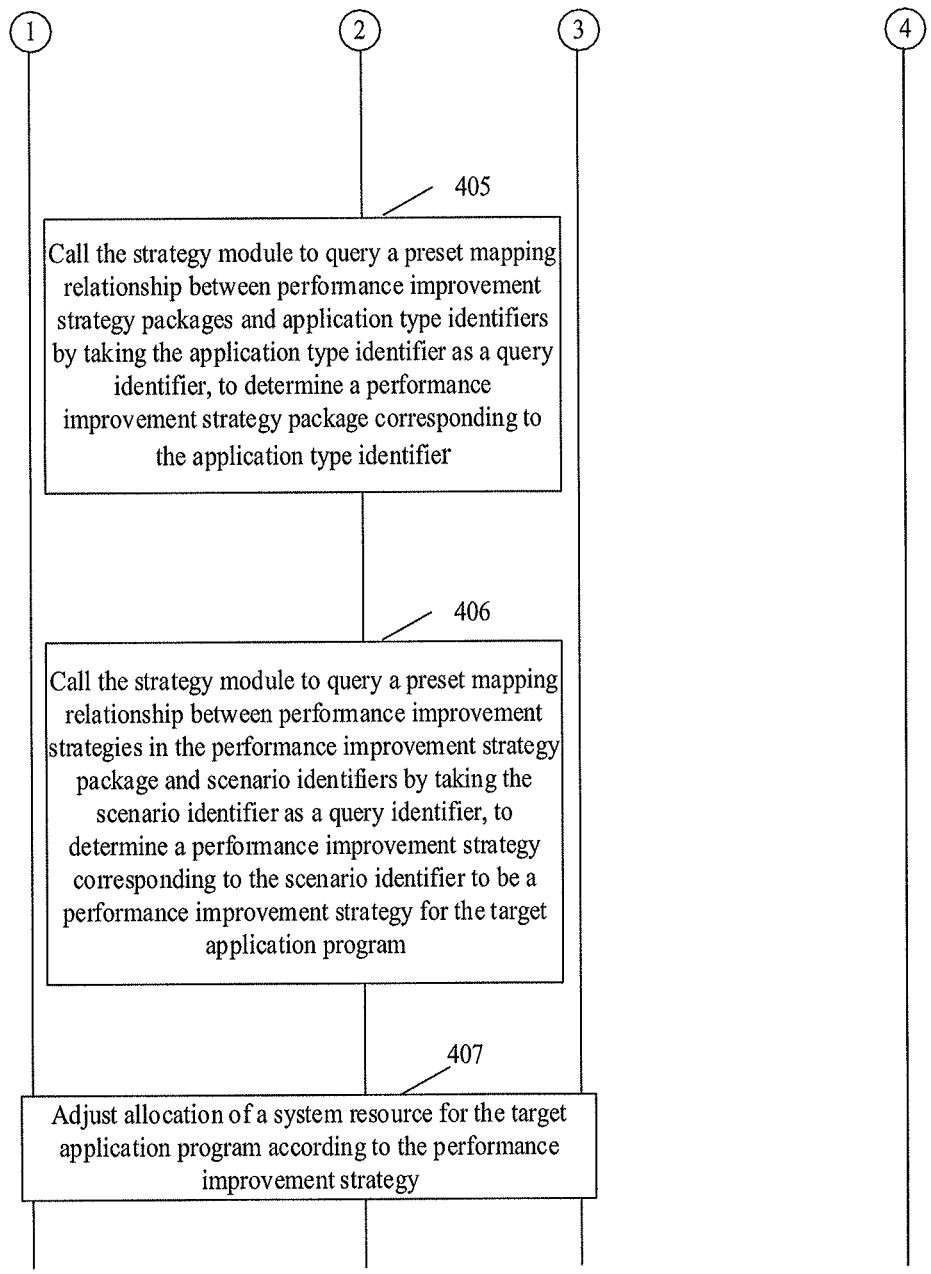
Figure 5:
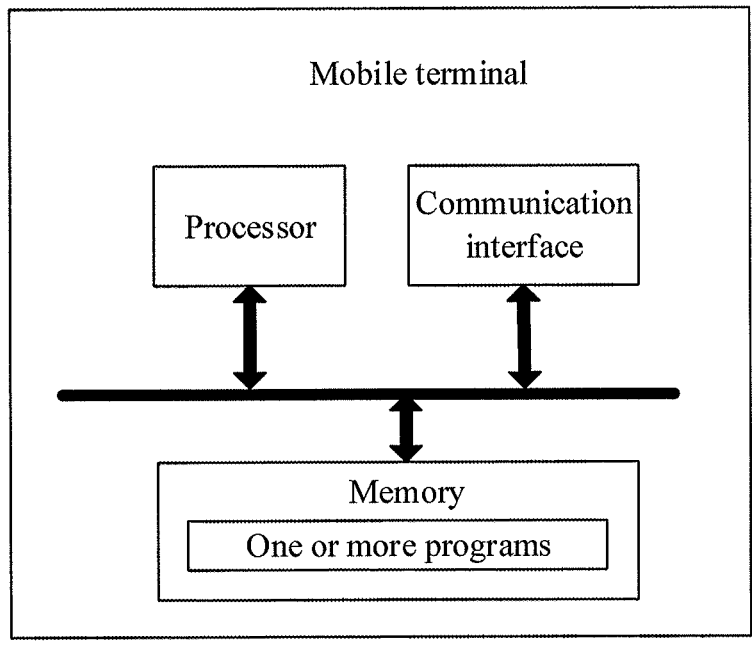
FIG. 5 illustrates a structure diagram of a mobile terminal according to an embodiment of the application.

Consistent with the embodiment illustrated in FIG. 2, FIGS. 4A and 4B illustrate a flowchart of a resource configuration method according to an embodiment of the application. The method is applied to a mobile terminal, in which an operating system and one or more application programs are running. The operating system includes a management module, multiple strategy modules and a data connection management module. Each strategy module is configured to determine a performance improvement strategy for an application program in at least one application program of the same application type. A target application program includes a data connection module. A scenario data packet includes an application type identifier and a scenario identifier of the target application program, and the scenario data packet further includes a data format identifier. As illustrated in the figure, the resource configuration method includes the following operations illustrated in blocks. The method may begin from block S401.

At block S401, the data connection management module establishes a data channel with the data connection module.

At block S402, the data connection management module receives the scenario data packet sent by the target application program through the data channel.

At block S403, the management module parses the scenario data packet in a data format indicated by the data format identifier, to determine the application type identifier and the scenario identifier of the target application program.

At block S404, the management module determines the strategy module corresponding to the application type identifier from the multiple strategy modules, and sends the application type identifier and the scenario identifier to the strategy module.

At block S405, the strategy module queries a preset mapping relationship between performance improvement strategy packages and application type identifiers by taking the application type identifier as a query identifier to determine a performance improvement strategy package corresponding to the application type identifier.

At block S406, the strategy module queries a preset mapping relationship between performance improvement strategies in the performance improvement strategy package and scenario identifiers by taking the scenario identifier as a query identifier to determine a performance improvement strategy corresponding to the scenario identifier to be a performance improvement strategy for the target application program.

At block S407, the operating system adjusts allocation of a system resource for the target application program according to the performance improvement strategy.

It can be seen that, in the embodiments of the application, the operating system in the operating system space of the mobile terminal firstly receives the scenario data packet sent by the running target application program, the scenario data packet including the application type identifier and the scenario identifier of the running target application program, then the operating system determines the performance improvement strategy for the running target application program according to the application type identifier and the scenario identifier, and finally, the operating system adjusts allocation of a system resource for the running target application program according to the performance improvement strategy. Since the scenario data packet includes the application type identifier and the scenario identifier of the target application program and the scenario data packet is sent by the running target application program, the operating system may accurately determine a practical strategy module according to the application type identifier and further call the strategy module to elaborately determine the performance improvement strategy for a present internal running scenario of the target application program according to the scenario identifier, and the operating system adjusts configuration of a system resource for the target application program in real time according to the performance improvement strategy. Therefore, the operating system may implement performance optimization of the running target application program in real time, thus facilitating increasing real-time capability and accuracy of controlling performance optimization of the target application program by the mobile terminal.

In addition, the multiple strategy modules may be classified to implement elaborate control over different types of applications, and the mobile terminal is not required to load all of the strategy modules at the same time and is only required to load the strategy module corresponding to the target application program, running in the foreground, of the mobile terminal, thus facilitating reduction of resource occupation and improvement of a resource utilization rate and control efficiency.

Moreover, the management module performs unified processing on the scenario data packet, the strategy module is only required to directly receive a processing result of the management module. Such a setting is favorable for weight reduction and elaboration of a function of the strategy module, brings convenience to operations such as maintenance, addition and the like over the strategy module and improves system stability.

Furthermore, the application type identifier is used to determine the corresponding performance improvement strategy package, the scenario identifier is used to further elaborately find the specific performance improvement strategy adapted to the scenario, and the specific performance improvement strategy may be rapidly found by a simple lookup algorithm according to the application type identifier and the scenario identifier. Therefore, the method has a low delay and a high accuracy, and improvement of the real-time capability and accuracy of controlling running optimization of the target application program by the mobile terminal is facilitated.

Consistent with the embodiments illustrated in FIG. 2, FIG. 3 and FIGS. 4A and 4B, FIG. 5 illustrates a structure diagram of a mobile terminal according to an embodiment of the application. One or more application programs and an operating system run in the mobile terminal. As illustrated in the figure, the mobile terminal includes a processor, a memory, a communication interface and one or more programs. The one or more programs are different from the abovementioned one or more application programs, the one or more programs are stored in the memory and are configured to be executed by the processor, and the programs include instructions configured to execute the following operations: controlling the operating system to receive a scenario data packet sent by a running target application program, the scenario data packet including an application type identifier of the target application program and a scenario identifier; controlling the operating system to determine a performance improvement strategy for the target application program according to the application type identifier and the scenario identifier; and controlling the operating system to adjust allocation of a system resource for the target application program according to the performance improvement strategy.

It can be seen that, in the embodiment of the application, the operating system in the operating system space of the mobile terminal firstly receives the scenario data packet sent by the running target application program, the scenario data packet including the application type identifier and the scenario identifier of the running target application program, then the operating system determines the performance improvement strategy for the running target application program according to the application type identifier and the scenario identifier, and finally, the operating system adjusts allocation of a system resource for the running target application program according to the performance improvement strategy. Since the scenario data packet includes the application type identifier and the scenario identifier of the target application program and the scenario data packet is sent by the running target application program, the operating system may accurately determine a practical strategy module according to the application type identifier and further call the strategy module to elaborately determine the performance improvement strategy for a present internal running scenario of the target application program according to the scenario identifier, and the operating system adjusts configuration of a system resource for the target application program in real time according to the performance improvement strategy. Therefore, the operating system may implement performance optimization of the running target application program in real time, thus facilitating increasing real-time capability and accuracy of controlling performance optimization of the target application program by the mobile terminal.

In a possible example, the operating system includes a management module and multiple strategy modules. Each strategy module is configured to determine a performance improvement strategy for an application program in at least one application program of the same application type. In terms of controlling the operating system to determine the performance improvement strategy for the target application program according to the application type identifier and the scenario identifier, the instructions in the programs are specifically configured to execute the following operations: controlling the management module to determine the application type identifier and scenario identifier from the scenario data packet; controlling the management module to determine the strategy module corresponding to the application type identifier from the multiple strategy modules; and controlling the strategy module to determine a performance improvement strategy corresponding to the scenario identifier to be the performance improvement strategy for the target application program.

In a possible example, the scenario data packet includes a data format identifier. In terms of controlling the management module to determine the application type identifier and scenario identifier from the scenario data packet, the instructions in the programs are specifically configured to execute the following operation: controlling the management module to parse the scenario data packet in a data format indicated by the data format identifier, to determine the application type identifier and the scenario identifier.

In a possible example, the operating system includes a management module and a strategy module. In terms of controlling the operating system to determine the performance improvement strategy for the target application program according to the application type identifier and the scenario identifier, the instructions in the program are specifically configured to execute the following operations: controlling the strategy module to acquire the application type identifier and scenario identifier from the scenario data packet; controlling the strategy module to determine a performance improvement strategy package corresponding to the application type identifier; and controlling the strategy module to determine the performance improvement strategy corresponding to the scenario identifier from the performance improvement strategy package to be the performance improvement strategy for the target application program.

In a possible example, in terms of controlling the strategy module to acquire the application type identifier and scenario identifier from the scenario data packet, the instructions in the program may be specifically configured to execute the following operations: controlling the management module to parse the scenario data packet in the data format indicated by the data format identifier, to determine the application type identifier and the scenario identifier of the target application program and send the application type identifier and the scenario identifier to the strategy module.

Alternatively, in terms of controlling the strategy module to acquire the application type identifier and scenario identifier from the scenario data packet, the instructions in the program may be specifically configured to execute the following operations: controlling the management module to send the scenario data packet to the strategy module and controlling the strategy module to parse the scenario data packet in the data format indicated by the data format identifier, to determine the application type identifier and the scenario identifier of the target application program; or, Alternatively, in terms of controlling the strategy module to acquire the application type identifier and scenario identifier from the scenario data packet, the instructions in the program may be specifically configured to execute the following operations: controlling the management module to determine a first data format associated with the strategy module, convert a second data format of the scenario data packet into the first data format upon detection of the first data format being inconsistent with the second data format of the scenario data packet, and send the converted scenario data packet to the strategy module, and controlling the strategy module to parse the converted scenario data packet in the first data format, to determine the application type identifier and the scenario identifier of the target application program.

In a possible example, in terms of controlling the strategy module to determine the performance improvement strategy package corresponding to the application type identifier, the instructions in the program may be specifically configured to execute the following operation: controlling the strategy module to query a preset mapping relationship between performance improvement strategy packages and application type identifiers by taking the application type identifier as a query identifier, to determine the performance improvement strategy package corresponding to the application type identifier.

In terms of controlling the strategy module to determine the performance improvement strategy corresponding to the scenario identifier from the performance improvement strategy package to be the performance improvement strategy for the target application program, the instructions in the program may be specifically configured to execute the following operation: controlling the strategy module to query a preset mapping relationship between performance improvement strategies in the performance improvement strategy package and scenario identifiers by taking the scenario identifier as a query identifier, to determine the performance improvement strategy corresponding to the scenario identifier to be the performance improvement strategy for the target application program.

In a possible example, the target application program includes a data connection module, and the operating system includes a data connection management module. In terms of controlling the operating system to receive the scenario data packet sent by the running target application program, the instructions in the program may be specifically configured to execute the following operations: controlling the data connection management module to establish a data channel with the data connection module; and controlling the data connection management module to receive the scenario data packet sent by the target application program through the data channel.

In a possible example, a resource includes at least one of the following resources of the mobile terminal: a CPU resource, a GPU resource, a memory bandwidth resource, a disk resource and a network resource.

The solutions of the embodiments of the application are introduced above mainly from the angle of a method-side execution process. It can be understood that, for realizing the abovementioned functions, the mobile terminal includes a hardware structure and/or software module corresponding to each function. Those skilled in the art may easily realize that the units and algorithm operations of each example described in combination with the embodiments disclosed in the disclosure may be implemented by hardware or in form of a hardware and computer software combination in the application. Whether a certain function is executed in a hardware manner or a manner of driving hardware by computer software depends on specific applications and design constraints of the technical solutions. Professionals may realize the described functions for each specific application by virtue of different methods, but such realization shall fall within the scope of the disclosure.

Functional units of the mobile terminal may be divided in the embodiments of the application according to the abovementioned method examples. For example, each functional unit corresponding to each function may be divided, and two or more than two functions may also be integrated into a processing unit. The integrated unit may be implemented in a hardware form and may also be implemented in form of software functional unit. It is to be noted that division of the units in the embodiments of the application is schematic and only logical function division and another division manner may be adopted during practical implementation.

Figure 6:
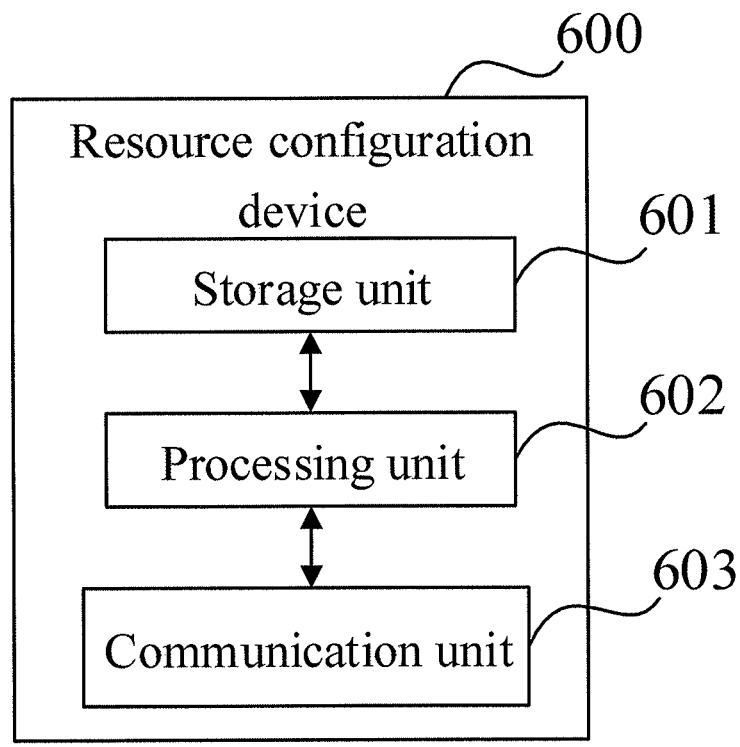
FIG. 6 illustrates a composition block diagram of functional units of a mobile terminal according to an embodiment of the application.

In the case of integrated units, FIG. 6 is a possible composition block diagram of functional units of a resource configuration device involved in the abovementioned embodiments. The resource configuration device 600 is applied to a mobile terminal, in which an operating system and one or more application programs are running. The resource configuration device 600 includes: a processing unit 602 and a communication unit 603. The processing unit 602 is configured to perform control management on actions of the resource configuration device. For example, the processing unit 602 is configured to support the resource configuration device to execute operations S201-S203 in FIG. 2, operations S301-S307 in FIG. 3, operations S401-S406 in FIGS. 4A and 4B and/or other processes of the technology described in the disclosure. The resource configuration device may further include a storage unit 601, configured to store program codes and data.

The processing unit 602 is configured to: control the operating system to receive a scenario data packet sent by a running target application program through the communication unit 603, the scenario data packet including an application type identifier and a scenario identifier of the target application program; control the operating system to determine a performance improvement strategy for the target application program according to the application type identifier and the scenario identifier; and control the operating system to adjust allocation of a system resource for the target application program according to the performance improvement strategy.

In a possible example, the operating system includes a management module and multiple strategy modules. Each strategy module is configured to determine a performance improvement strategy for an application program in at least one application program of the same application type. In terms of controlling the operating system to determine the performance improvement strategy for the target application program according to the application type identifier and the scenario identifier, the processing unit 602 may be specifically configured to: control the management module to determine the application type identifier and scenario identifier from the scenario data packet; control the management module to determine the strategy module corresponding to the application type identifier from the multiple strategy modules; and control the strategy module to determine a performance improvement strategy corresponding to the scenario identifier to be the performance improvement strategy for the target application program.

In a possible example, the scenario data packet includes a data format identifier. In terms of controlling the management module to determine the application type identifier and scenario identifier from the scenario data packet, the processing unit 602 may be specifically configured to: control the management module to parse the scenario data packet in a data format indicated by the data format identifier, to determine the application type identifier and the scenario identifier.

In a possible example, the operating system includes a management module and a strategy module. In terms of controlling the operating system to determine the performance improvement strategy for the target application program according to the application type identifier and the scenario identifier, the processing unit 602 is specifically configured to: control the strategy module to acquire the application type identifier and scenario identifier in the scenario data packet; control the strategy module to determine a performance improvement strategy package corresponding to the application type identifier; and control the strategy module to determine the performance improvement strategy corresponding to the scenario identifier from the performance improvement strategy package to be the performance improvement strategy for the target application program.

In a possible example, in terms of controlling the strategy module to acquire the application type identifier and scenario identifier from the scenario data packet, the processing unit 602 may be specifically configured to: control the management module to parse the scenario data packet in the data format indicated by the data format identifier, to determine the application type identifier and the scenario identifier of the target application program, and send the application type identifier and the scenario identifier to the strategy module.

Alternatively, in terms of controlling the strategy module to acquire the application type identifier and scenario identifier from the scenario data packet, the processing unit 602 may be specifically configured to: control the management module to send the scenario data packet to the strategy module and control the strategy module to parse the scenario data packet in the data format indicated by the data format identifier, to determine the application type identifier and the scenario identifier of the target application program.

Alternatively, in terms of controlling the strategy module to acquire the application type identifier and scenario identifier from the scenario data packet, the processing unit 602 may be specifically configured to: control the management module to determine a first data format associated with the strategy module, convert a second data format of the scenario data packet into the first data format upon detection of the first data format being inconsistent with the second data format of the scenario data packet, and send the converted scenario data packet to the strategy module, and control the strategy module to parse the converted scenario data packet in the first data format, to determine the application type identifier and the scenario identifier of the target application program.

In a possible example, in terms of controlling the strategy module to determine the performance improvement strategy package corresponding to the application type identifier, the processing unit 602 may be specifically configured to: control the strategy module to query a preset mapping relationship between performance improvement strategy packages and application type identifiers by taking the application type identifier as a query identifier, to determine the performance improvement strategy package corresponding to the application type identifier.

In terms of controlling the strategy module to determine the performance improvement strategy corresponding to the scenario identifier from the performance improvement strategy package to be the performance improvement strategy for the target application program, the processing unit 602 may be specifically configured to: control the strategy module to query a preset mapping relationship between performance improvement strategies in the performance improvement strategy package and scenario identifiers by taking the scenario identifier as a query identifier, to determine the performance improvement strategy corresponding to the scenario identifier to be the performance improvement strategy for the target application program.

In a possible example, the target application program includes a data connection module, and the operating system includes a data connection management module. In terms of controlling the operating system to receive the scenario data packet sent by the running target application program, the processing unit 602 may be specifically configured to: control the data connection management module to establish a data channel with the data connection module; and control the data connection management module to receive the scenario data packet sent by the target application program through the data channel.

In a possible example, a resource includes at least one of the following resources of the mobile terminal: a CPU resource, a GPU resource, a memory bandwidth resource, a disk resource and a network resource.

The processing unit 602 may be a processor or a controller, the communication unit 603 may be an internal communication interface between the processor and a program running space, for example, a communication interface of the processor and an operating system space or a communication interface between the processor and a user space, and the storage unit 601 may be a memory.

Figure 7:
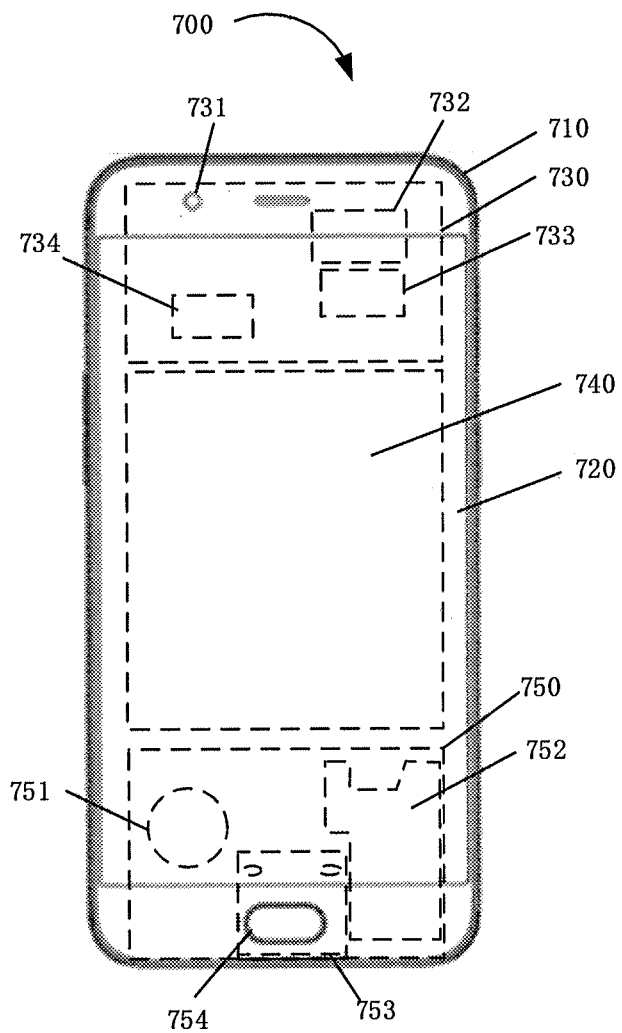
FIG. 7 illustrates a structure diagram of a smart phone according to an embodiment of the application.

FIG. 7 illustrates a structure diagram of a smart phone 700 according to an embodiment of the application. The smart phone 700 includes: a casing 710, a touch display screen 720, a main board 730, a battery 740 and an auxiliary board 750. A front camera 731, a processor 732, a memory 733, a power management chip 734 and the like are arranged on the main board 730. A vibrator 751, an integrated audio cavity 752, a VOOC interface 753 and a fingerprint identification module 754 are arranged on the auxiliary board.

The smart phone includes a target application program and an operating system, the target application program runs in a user space, the operating system runs in an operating system space, and the operating system includes an operating system. The operating system receives a scenario data packet sent by the running target application program, the scenario data packet including an application type identifier and a scenario identifier of the target application program; the operating system determines a performance improvement strategy for the target application program according to the application type identifier and the scenario identifier; and the operating system adjusts allocation of a system resource for the target application program according to the performance improvement strategy.

The processor 732 is a control center of the smart phone, connects each part of the whole smart phone by virtue of various interfaces and lines, and runs or executes software programs and/or modules stored in the memory 733 and calls data stored in the memory 733 to execute various functions of the smart phone and process the data, thereby monitoring the whole smart phone. In an embodiment, the processor 732 may include one or more processing units, for example, the processor 732 may integrate an application processor and a modulation and demodulation processor, wherein the application processor mainly processes the operating system, a user interface, an application program and the like, and the modulation and demodulation processor mainly processes wireless communication. It can be understood that the modulation and demodulation processor may also not be integrated into the processor 732. The processor 732 may be, for example, a CPU, a universal processor, a Digital Signal Processor (DSP), an Application-Specific Integrated Circuit (ASIC), a Field Programmable Gate Array (FPGA) or another programmable logical device, a transistor logical device, a hardware part or any combination thereof. Various exemplary logical block diagrams, modules and circuits described by the contents disclosed in the application may be implemented or executed. The processor may also be a combination realizing a calculation function, for example, a combination including one or more microprocessors and a combination of the DSP and the microprocessors.

The memory 733 may be configured to store the software programs and modules, and the processor 732 runs the software programs and modules stored in the memory 733, thereby executing various functional applications and data processing of the smart phone. The memory 733 may mainly include a program storage area and a data storage area, wherein the program storage area may store the operating system, the application programs required by at least one function and the like; and the data storage area may store data created according to use of the smart phone and the like. In addition, the memory 733 may include a high-speed Random Access Memory (RAM), and may further include a nonvolatile memory, for example, at least one disk storage device, a flash memory device or another nonvolatile solid-state storage device. The memory 733 may be, for example, a RAM, a flash memory, a Read Only Memory (ROM), an Erasable Programmable ROM (EPROM), an Electrically EPROM (EEPROM), a register, a hard disk, a mobile hard disk, a Compact Disc ROM (CD-ROM) or a storage medium in any other well-known form in the art.

The embodiments of the application further provide a computer storage medium, wherein the computer storage medium stores a computer program for electronic data exchange, the computer program causes a computer to execute part or all of the operations of any method recorded in the abovementioned method embodiment, and the computer includes a mobile terminal.

The embodiments of the application further include a computer program product, the computer program product includes a non-transitory computer-readable storage medium storing a computer program, and the computer program may be operated to cause a computer to execute part or all of the operations of any method recorded in the abovementioned method embodiment. The computer program product may be a software installation package, and the computer includes a mobile terminal.

It is to be noted that, for simple description, each abovementioned method embodiment is expressed into a combination of a series of actions. However, those skilled in the art should know that the application is not limited by an action sequence described herein because some operations may be executed in another sequence or at the same time according to the application. Second, those skilled in the art should also know that the embodiments described in the specification all belong to embodiments and involved actions and modules are not always necessary to the application.

Each embodiment in the abovementioned embodiments is described with different emphases, and undetailed parts in a certain embodiment may be seen from related descriptions in the other embodiments.

In some embodiments provided by the application, it should be understood that the disclosed device may be implemented in another manner. For example, the device embodiment described above is only schematic, and for example, division of the units is only logical function division, and other division manners may be adopted during practical implementation. For example, multiple units or components may be combined or integrated into another system, or some characteristics may be neglected or not executed. In addition, coupling or direct coupling or communication connection between each displayed or discussed component may be indirect coupling or communication connection, implemented through some interfaces, of the device or the units, and may be electrical or adopt other forms.

The units described as separate parts may or may not be physically separated, and parts displayed as units may or may not be physical units, and namely may be located in the same place, or may also be distributed to multiple network units. Part or all of the units may be selected to achieve the purpose of the solutions of the embodiments according to a practical requirement.

In addition, each function unit in each embodiment of the application may be integrated into a processing unit, each unit may also physically exist independently, and two or more than two units may also be integrated into a unit. The integrated unit may be implemented in a hardware form and may also be implemented in form of software functional unit.

When being implemented in form of software function unit and sold or used as an independent product, the integrated unit may be stored in a computer-readable memory. Based on such an understanding, the technical solutions of the application substantially or parts making contributions to the conventional art or all or part of the technical solutions may be embodied in form of software product, and the computer software product is stored in a memory, including a plurality of instructions configured to enable a piece of computer devices (which may be a personal computer, a server, network devices or the like) to execute all or part of the operations of the method in each embodiment of the application. The memory includes: various media capable of storing program codes such as a U disk, a ROM, a RAM, a mobile hard disk, a magnetic disk or an optical disk.

Those of ordinary skilled in the art can understand that all or part of the operations in various methods of the embodiments may be completed by related hardware instructed by a program, the program may be stored in a computer-readable memory, and the memory may include a flash disk, a ROM, a RAM, a magnetic disk, an optical disk or the like.

The embodiments of the application are introduced above in detail, the principle and implementation modes of the application are elaborated with specific examples in the disclosure, and the descriptions made to the embodiments are only adopted to help the method of the application and the core concept thereof to be understood. In addition, those of ordinary skilled in the art may make variations to the specific implementation modes and the application scope according to the concept of the application. From the above, the contents of the specification should not be understood as limits to the application.

The invention claimed is:

1. A resource configuration method, applied to a mobile terminal, in which an operating system and one or more application programs are running, the method comprising:
receiving, by the operating system, a scenario data packet sent by a running target application program, the scenario data packet comprising an application type identifier and a scenario identifier of the target application program;
determining, by the operating system, a performance improvement strategy for the target application program according to the application type identifier and the scenario identifier; and
automatically adjusting, by the operating system, allocation of a system resource for the target application program according to the performance improvement strategy,
wherein the operating system comprises a management module and multiple strategy modules, and each strategy module is configured to determine a performance improvement strategy for at least one application program of a respective application type, and
wherein determining, by the operating system, the performance improvement strategy for the target application program according to the application type identifier and the scenario identifier comprises:
determining, by the management module, the application type identifier and scenario identifier from the scenario data packet;
selecting, by the management module, a strategy module corresponding to the application type identifier from the multiple strategy modules; and
determining, by the strategy module determined by the management module, a performance improvement strategy corresponding to the scenario identifier to be the performance improvement strategy for the target application program,
wherein the scenario data packet comprises a data format identifier, and
wherein determining, by the management module, the application type identifier and scenario identifier from the scenario data packet comprises: automatically parsing, by the management module, the scenario data packet in a data format indicated by the data format identifier, to determine the application type identifier and the scenario identifier.

2. The method according to claim 1, wherein the operating system comprises a management module and a strategy module, and
wherein determining, by the operating system, the performance improvement strategy for the target application program according to the application type identifier and the scenario identifier comprises:
acquiring, by the strategy module, the application type identifier and scenario identifier from the scenario data packet;
determining, by the strategy module, a performance improvement strategy package corresponding to the application type identifier; and
determining, by the strategy module, the performance improvement strategy corresponding to the scenario identifier from the performance improvement strategy package to be the performance improvement strategy for the target application program.

3. The method according to claim 2, wherein the scenario data packet comprises a data format identifier; and
wherein acquiring, by the strategy module, the application type identifier and scenario identifier from the scenario data packet comprises:
sending the application type identifier and the scenario identifier to the strategy module;
or, sending, by the management module, the scenario data packet to the strategy module, and parsing, by the strategy module, the scenario data packet in the data format indicated by the data format identifier, to determine the application type identifier and the scenario identifier of the target application program;

or, determining, by the management module, a first data format associated with the strategy module, converting a second data format of the scenario data packet into the first data format upon detection of the first data format being inconsistent with the second data format of the scenario data packet, and sending the converted scenario data packet to the strategy module, and parsing, by the strategy module, the converted scenario data packet in the first data format, to determine the application type identifier and the scenario identifier of the target application program.

4. The method according to claim 2, wherein determining, by the strategy module, the performance improvement strategy package corresponding to the application type identifier comprises:

querying, by the strategy module, a preset mapping relationship between performance improvement strategy packages and application type identifiers by taking the application type identifier as a query identifier, to determine the performance improvement strategy package corresponding to the application type identifier; and wherein determining, by the strategy module, the performance improvement strategy corresponding to the scenario identifier from the performance improvement strategy to be the performance improvement strategy for the target application program comprises:

querying, by the strategy module, a preset mapping relationship between performance improvement strategies in the performance improvement strategy package and scenario identifiers by taking the scenario identifier as a query identifier, to determine the performance improvement strategy corresponding to the scenario identifier to be the performance improvement strategy for the target application program.

5. The method according to claim 1, wherein a preset data channel is provided between the target application program and the operating system; and wherein receiving, by the operating system, the scenario data packet sent by the running target application program comprises: receiving, by the operating system, the scenario data packet sent by the target application program through the preset data channel.

6. A mobile terminal, comprising:

a processor, and a memory storing a computer program, wherein the computer program, when running in the processor, implements a resource configuration method, the method comprises:

receiving a scenario data packet sent by a running target application program, the scenario data packet comprises an application type identifier and a scenario identifier of the target application program;

determining a performance improvement strategy for the target application program according to the application type identifier and the scenario identifier; and automatically adjusting allocation of a system resource for the target application program according to the performance improvement strategy, wherein the computer program comprises a management module and multiple strategy modules, and each strategy module is configured to determine a performance improvement strategy for at least one application program of a respective application type, and wherein determining the performance improvement strategy for the target application program according to the application type identifier and the scenario identifier comprises:

determining, by the management module, the application type identifier and scenario identifier from the scenario data packet;

selecting, by the management module, a strategy module corresponding to the application type identifier from the multiple strategy modules; and determining, by the strategy module determined by the management module, a performance improvement strategy corresponding to the scenario identifier to be the performance improvement strategy for the target application program, wherein the scenario data packet comprises a data format identifier; and wherein determining, by the management module, the application type identifier and scenario identifier from the scenario data packet comprises: automatically parsing, by the management module, the scenario data packet in a data format indicated by the data format identifier, to determine the application type identifier and the scenario identifier.

7. The mobile terminal according to claim 6, wherein the computer program comprises a management module and a strategy module, and wherein determining the performance improvement strategy for the target application program according to the application type identifier and the scenario identifier comprises:

acquiring, by the strategy module, the application type identifier and scenario identifier from the scenario data packet;

determining, by the strategy module, a performance improvement strategy package corresponding to the application type identifier; and determining, by the strategy module, the performance improvement strategy corresponding to the scenario identifier from the performance improvement strategy package to be the performance improvement strategy for the target application program.

8. The mobile terminal according to claim 7, wherein the scenario data packet comprises a data format identifier; and wherein acquiring, by the strategy module, the application type identifier and scenario identifier from the scenario data packet comprises:

sending the application type identifier and the scenario identifier to the strategy module;

or, sending, by the management module, the scenario data packet to the strategy module, and parsing, by the strategy module, the scenario data packet in the data format indicated by the data format identifier, to determine the application type identifier and the scenario identifier of the target application program;

or, determining, by the management module, a first data format associated with the strategy module, converting a second data format of the scenario data packet into the first data format upon detection of the first data format being inconsistent with the second data format of the scenario data packet, and sending the converted scenario data packet to the strategy module, and parsing, by the strategy module, the converted scenario data packet in the first data format, to determine the application type identifier and the scenario identifier of the target application program.

9. The mobile terminal according to claim 7, wherein determining, by the strategy module, the performance improvement strategy package corresponding to the application type identifier comprises:
querying, by the strategy module, a preset mapping relationship between performance improvement strategy packages and application type identifiers by taking the application type identifier as a query identifier, to determine the performance improvement strategy package corresponding to the application type identifier; and
wherein determining, by the strategy module, the performance improvement strategy corresponding to the scenario identifier from the performance improvement strategy to be the performance improvement strategy for the target application program comprises:
querying, by the strategy module, a preset mapping relationship between performance improvement strategies in the performance improvement strategy package and scenario identifiers by taking the scenario identifier as a query identifier, to determine the performance improvement strategy corresponding to the scenario identifier to be the performance improvement strategy for the target application program.

10. The mobile terminal according to claim 6, wherein a preset data channel is provided between the target application program and the computer program; and
wherein receiving the scenario data packet sent by the running target application program comprises: receiving the scenario data packet sent by the target application program through the preset data channel.

11. A non-transitory computer-readable storage medium, storing a computer program, wherein the computer program, when running in a processor, implements a resource allocation method, the method comprising:
receiving a scenario data packet sent by a running target application, the scenario data packet comprising an application type identifier and a scenario identifier of the target application program;
determining a performance improvement strategy for the target application program according to the application type identifier and the scenario identifier; and
automatically adjusting allocation of a system resource for the target application program according to the performance improvement strategy,
wherein the computer program comprises a management module and multiple strategy modules, and each strategy module is configured to determine a performance improvement strategy for at least one application program of a respective application type, and
wherein determining the performance improvement strategy for the target application program according to the application type identifier and the scenario identifier comprises:
determining, by the management module, the application type identifier and scenario identifier from the scenario data packet;
selecting, by the management module, a strategy module corresponding to the application type identifier from the multiple strategy modules; and determining, by the strategy module determined by the management module, a performance improvement strategy corresponding to the scenario identifier to be the performance improvement strategy for the target application program,
wherein the scenario data packet comprises a data format identifier; and
wherein determining, by the management module, the application type identifier and scenario identifier from the scenario data packet comprises: automatically parsing, by the management module, the scenario data packet in a data format indicated by the data format identifier, to determine the application type identifier and the scenario identifier.

12. The non-transitory computer-readable storage medium according to claim 11, wherein the computer program comprises a management module and a strategy module, and
wherein determining the performance improvement strategy for the target application program according to the application type identifier and the scenario identifier comprises:
acquiring, by the strategy module, the application type identifier and scenario identifier from the scenario data packet;
determining, by the strategy module, a performance improvement strategy package corresponding to the application type identifier; and
determining, by the strategy module, the performance improvement strategy corresponding to the scenario identifier from the performance improvement strategy package to be the performance improvement strategy for the target application program.

13. The non-transitory computer-readable storage medium according to claim 12, wherein the scenario data packet comprises a data format identifier; and
wherein acquiring, by the strategy module, the application type identifier and scenario identifier from the scenario data packet comprises:
sending the application type identifier and the scenario identifier to the strategy module;
or,
sending, by the management module, the scenario data packet to the strategy module, and parsing, by the strategy module, the scenario data packet in the data format indicated by the data format identifier, to determine the application type identifier and the scenario identifier of the target application program;
or,
determining, by the management module, a first data format associated with the strategy module, converting a second data format of the scenario data packet into the first data format upon detection of the first data format being inconsistent with the second data format of the scenario data packet, and sending the converted scenario data packet to the strategy module, and parsing, by the strategy module, the converted scenario data packet in the first data format, to determine the application type identifier and the scenario identifier of the target application program.

14. The non-transitory computer-readable storage medium according to claim 12, wherein determining, by the strategy module, the performance improvement strategy package corresponding to the application type identifier comprises:
querying, by the strategy module, a preset mapping relationship between performance improvement strategy packages and application type identifiers by taking the application type identifier as a query identifier, to determine the performance improvement strategy package corresponding to the application type identifier; and wherein determining, by the strategy module, the performance improvement strategy corresponding to the scenario identifier from the performance improvement strategy to be the performance improvement strategy for the target application program comprises:

querying, by the strategy module, a preset mapping relationship between performance improvement strategies in the performance improvement strategy package and scenario identifiers by taking the scenario identifier as a query identifier, to determine the performance improvement strategy corresponding to the scenario identifier to be the performance improvement strategy for the target application program.

* * * * *